(12) United States Patent
Li

(10) Patent No.: US 12,134,289 B2
(45) Date of Patent: Nov. 5, 2024

(54) TRAILER LOCK

(71) Applicant: Ningbo Panyu Hardware Products Co., Ltd., Ningbo (CN)

(72) Inventor: Qilong Li, Ningbo (CN)

(73) Assignee: Ningbo Panyu Hardware Products Co., Ltd., Ningbo (CN)

(*) Notice: Subject to any disclaimer, the term of this patent is extended or adjusted under 35 U.S.C. 154(b) by 751 days.

(21) Appl. No.: 16/771,755

(22) PCT Filed: Jan. 2, 2019

(86) PCT No.: PCT/CN2019/070006
§ 371 (c)(1),
(2) Date: Sep. 13, 2021

(87) PCT Pub. No.: WO2020/124689
PCT Pub. Date: Jun. 25, 2020

(65) Prior Publication Data
US 2022/0032699 A1 Feb. 3, 2022

(30) Foreign Application Priority Data
Dec. 20, 2018 (CN) .......................... 201811595908.6

(51) Int. Cl.
*B60D 1/60* (2006.01)
*B60R 25/00* (2013.01)
(Continued)

(52) U.S. Cl.
CPC .............. *B60D 1/60* (2013.01); *B60R 25/001* (2013.01); *E05B 67/36* (2013.01); *E05B 83/02* (2013.01);
(Continued)

(58) Field of Classification Search
CPC .......... E05B 67/22; E05B 67/36; E05B 73/00; E05B 83/00; E05B 83/02; E05B 17/04;
(Continued)

(56) References Cited

U.S. PATENT DOCUMENTS

| 4,236,395 A * | 12/1980 | Avaiusini ................ E05B 67/36 70/34 |
| 5,664,445 A * | 9/1997 | Chang ...................... B60D 1/60 70/386 |
| 5,992,187 A * | 11/1999 | Derman ................ E05B 67/003 70/30 |
| 6,364,339 B1 * | 4/2002 | Lee ......................... B60D 1/60 280/507 |

(Continued)

FOREIGN PATENT DOCUMENTS

| CN | 2583288 Y | 10/2003 |
| CN | 102449254 A | 5/2012 |

OTHER PUBLICATIONS

International Search Report of PCT/CN2019/070006.
Written Opinion of PCT/CN2019/070006.

*Primary Examiner* — Christopher J Boswell

(57) ABSTRACT

The present invention discloses a trailer lock including a lock bar and a cylinder connected with the lock bar, wherein the cylinder includes an outer casing, a plug casing mounted at a front end of the outer casing and a plug provided in a middle of the plug casing, and further includes a bolt casing fixed in the outer casing and a cam accommodated in the bolt casing and connected with the plug, a telescopic core is provided in the cam, telescopic bolts for fixing the lock bar are provided at two sides of the bolt casing, the bolt has a front end connected with a rear end of the cam, and the lock bar has a front end provided with a press head having an annular neck where the bolt is clamped. The trailer lock designed in this way is convenient to use.

1 Claim, 6 Drawing Sheets

(51) Int. Cl.
  *E05B 67/36* (2006.01)
  *E05B 83/02* (2014.01)
  *E05B 85/06* (2014.01)
  *E05B 17/04* (2006.01)
  *E05B 29/00* (2006.01)

(52) U.S. Cl.
  CPC .............. *E05B 85/06* (2013.01); *E05B 17/04* (2013.01); *E05B 29/0026* (2013.01)

(58) Field of Classification Search
  CPC ... E05B 29/0026; E05B 85/06; B60R 25/001; B60D 1/60

See application file for complete search history.

(56) References Cited

U.S. PATENT DOCUMENTS

| | | | |
|---|---|---|---|
| 6,402,181 B1* | 6/2002 | Lee | B60D 1/60 |
| | | | 280/507 |
| 6,543,260 B2* | 4/2003 | Koy | E05B 67/365 |
| | | | 280/507 |
| 6,913,413 B2* | 7/2005 | Yang | F16B 21/18 |
| | | | 403/321 |
| 7,997,106 B2* | 8/2011 | Mahaffey | E05B 73/00 |
| | | | 70/49 |
| 8,302,435 B2* | 11/2012 | Burmesch | B60D 1/02 |
| | | | 70/34 |
| 2007/0137266 A1 | 6/2007 | Hsai | |
| 2011/0036129 A1* | 2/2011 | Frantz | B60D 1/52 |
| | | | 70/57 |
| 2016/0326781 A1* | 11/2016 | Chen | B60D 1/60 |

* cited by examiner

TRAILER LOCK

CROSS-REFERENCE TO RELATED PATENT APPLICATION

This application is a national stage application of PCT Application No. PCT/CN2019/070006. This Application claims priority from PCT Application No. PCT/CN2019/070006, filed Jan. 2, 2019, CN Application No. CN 201811595908.6 filed Dec. 20, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to a trailer lock.

BACKGROUND

A trailer lock in a prior art, such as a new trailer lock disclosed in Chinese Patent No. 201720824926.1, includes a lock bar, a seal ring and a lock body, wherein double flat surfaces are provided at one end of the lock bar and have two sides provided with grooves; the lock body includes a lock case, a cylinder, a twisting head and a steel ball, the lock case has one end provided with an accommodating groove and the other end provided with an insertion opening fitted with the double flat surfaces and communicated with the accommodating groove, the cylinder is accommodated in and fixedly connected with the accommodating groove and has an inner side end provided with a plug and a cylinder positioning portion R, the cylinder is sleeved with the twisting head accommodated in the accommodating groove of the lock case together with the cylinder, the twisting head has a sleeved end provided with a cam transmission groove and the other end provided with a steel ball position, and the steel ball is placed at the steel ball position of the twisting head; the double flat surfaces of the lock bar are inserted into the insertion opening of the lock case through the seal ring, and the plug is rotated by a key to drive the twisting head to buckle the steel ball into the grooves at the two sides of the double flat surfaces of the lock body for locking.

In the trailer lock according to the above-mentioned technical solution, the plug is required to be rotated by the key during assembly of the lock body and the lock bar which are unable to be directly mounted together, and the steel ball is also inconvenient to use.

Therefore, a heretofore unaddressed need exists in the art to address the aforementioned deficiencies and inadequacies.

SUMMARY

In view of the above-mentioned defects in the prior art, an object of the present invention is to provides a trailer lock convenient to use.

In the technical solution of the present invention, a trailer lock includes a lock bar and a cylinder connected with the lock bar, wherein the cylinder includes an outer casing, a plug casing mounted at a front end of the outer casing and a plug provided in a middle of the plug casing, and further includes a bolt casing fixed in the outer casing and a cam accommodated in the bolt casing and connected with the plug, a telescopic core is provided in the cam, telescopic bolts for fixing the lock bar are provided at two sides of the bolt casing, the bolt has a front end connected with a rear end of the cam, and the lock bar has a front end provided with a press head having an annular neck where the bolt is clamped.

Further, through holes where the bolt is clamped are provided at two sides of a rear end of the bolt casing, the bolt is mounted into the bolt casing along the through hole, a bump connected with the cam is provided at the front end of the bolt, and a first spring is provided between the bolt and the outer casing.

Further, an accommodating hole is provided at an outer side of the bolt, and the first spring extends into the accommodating hole and has an outer end pressed against an inner wall of the outer casing.

Further, the cam has a front end provided with an insertion hole where a rear end of the plug is inserted, an accommodating groove is formed at the rear end of the cam, a second spring is mounted in the accommodating groove and has a rear end connected with the telescopic core, and a rotating block, provided at the rear end of the cam, is abutted against an inner side of the bump.

Further, the rotating block is oval, and an arc convex surface is provided at the inner side of the bump.

Further, a channel is formed between the two bolts and has a large rear-end opening and a small front-end opening, a through hole is provided at a rear end of the outer casing, the press head sequentially penetrates through the through hole and the channel, pushes the bolt away to extend into the accommodating groove of the cam, and is then pressed against the telescopic core, and an inner end of the bolt is clamped into the neck of the press head.

The trailer lock according to the present invention has the following beneficial effects. During assembly, the press head at the front end of the lock bar is inserted into the outer casing directly, and pushes the bolt away to extend into the cam and press the telescopic core, then the inner end of the bolt is clamped into the neck of the press head by an elastic force of the first spring, and the lock bar is fixed completely; during disassembly, the key is inserted into the plug, the plug is rotated to drive the cam to rotate, the bolt is pressed to move outwards by the rear end of the cam after rotation, and separated from the neck, the press head is pushed backwards by the telescopic core, the lock bar is pushed backwards, and then the lock bar may be pulled out, such that the key is not required to be rotated during assembly, disassembly is convenient, and people use is facilitated.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
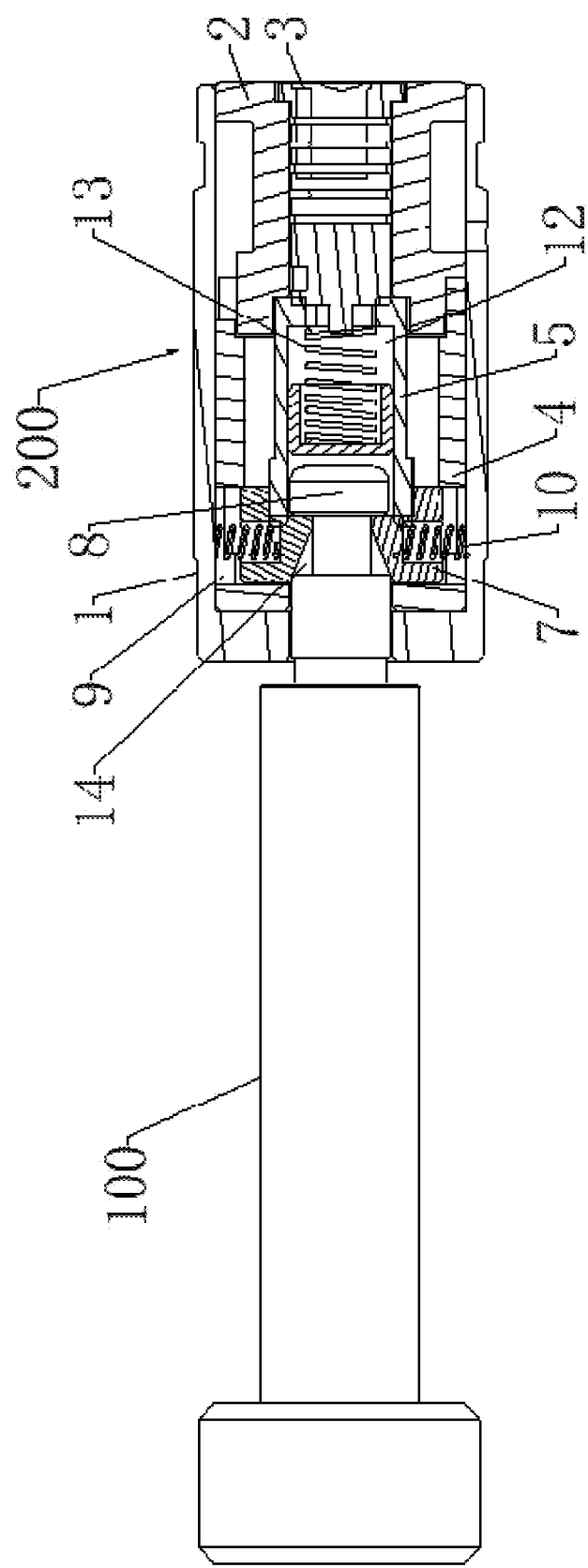
FIG. 1 is a schematic diagram of an overall structure according to the present invention (after assembly)

In the drawings: 100—lock bar, 200—cylinder, 1—outer casing, 2—plug casing, 3—plug, 4—bolt casing, 5—cam, 51—rotating block, 6—telescopic core, 7—bolt, 71—bump, 711—arc convex surface, 8—press head, 81—neck, 9—through hole, 10—first spring, 11—insertion hole, 12—accommodating groove, 13—second spring, 14—channel, 15—through hole, 16—accommodating hole.

DETAILED DESCRIPTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

For an intuitive and complete understanding of the technical solution of the present invention, the following non-limiting features will now be described in conjunction with the accompanying drawings of the present invention.

As shown in FIGS. 1-8, a trailer lock includes a lock bar 100 and a cylinder 200 connected with the lock bar 100, wherein the cylinder 200 includes an outer casing 1, a plug casing 2 mounted at a front end of the outer casing 1 and a plug 3 provided in a middle of the plug casing 2, the outer casing 1 is integrally formed, the cylinder 200 further includes a bolt casing 4 fixed in the outer casing 1 and a cam 5 accommodated in the bolt casing 4 and connected with the plug 3, a telescopic core 6 is provided in the cam 5, telescopic bolts 7 for fixing the lock bar 100 are provided at two sides of the bolt casing 4, the bolt 7 has a front end connected with a rear end of the cam 5, and the lock bar 100 has a front end provided with a press head 8 having an annular neck 81 where the bolt 7 is clamped.

Through holes 9 where the bolt 7 is clamped are provided at two sides of a rear end of the bolt casing 4, the bolt 7 is mounted into the bolt casing 4 along the through hole 9, a bump 71 connected with the cam 5 is provided at an outer side of the front end of the bolt 7, and a first spring 10 is provided between the bolt 7 and the outer casing 1. An accommodating hole 16 is provided at an outer side of the bolt 7, and the first spring 10 extends into the accommodating hole 16 and has an outer end pressed against an inner wall of the outer casing 1. When pressed by the press head 8, the bolt 7 is moved outwards, and the first spring 10 is compressed.

The cam 5 has a front end provided with an insertion hole 11 where a rear end of the plug 3 is inserted, an accommodating groove 12 is formed at the rear end of the cam 5, a second spring 13 is mounted in the accommodating groove 12 and has a rear end connected with the telescopic core 6, a rotating block 51, provided at the rear end of the cam 5, is abutted against an inner side of the bump 71, the rotating block 51 is oval, and an arc convex surface 711 is provided at the inner side of the bump 71. When the plug 3 is not rotated using a key, a side wall of the rotating block 51 in a short axis direction thereof comes into contact with the bump 71 at the front end of the bolt 7 without pressing the bump 71, and when the rotating block 51 is rotated, the bump 71 is pressed by a side wall of the rotating block 51 in a long axis direction thereof, the bolt 7 is moved outwards, and the first spring 10 is compressed.

A channel 14 is formed between the two bolts 7 and has a large rear-end opening and a small front-end opening. That is, the bolt 7 has an oblique inner wall. A through hole 15 is provided at a rear end of the outer casing 1, and the press head 8 is inserted into the channel 14 to come into contact with the inner wall of the bolt 7 and gradually press the bolt 7 outwards. The press head 8 sequentially penetrates through the through hole 15 and the channel 14, pushes the bolt 7 away to extend into the accommodating groove 12 of the cam 5, and is then pressed against the telescopic core 6, and after the press head 8 is separated from the bolt 7, the bolt 7 is subjected to an elastic force of the first spring 10, and an inner end of the bolt 7 is clamped into the neck 81 of the press head 8.

During assembly, the press head 8 at the front end of the lock bar 100 is inserted into the outer casing 1 directly, and pushes the bolt 7 away to extend into the cam 5 and press the telescopic core 6, the second spring 13 is compressed, the inner end of the bolt 7 is clamped into the neck 81 of the press head 8 by the elastic force of the first spring 10 at the moment when the press head 8 is separated from the bolt 7, and the lock bar 100 is fixed completely, as shown in FIG. 1.

Figure 2:
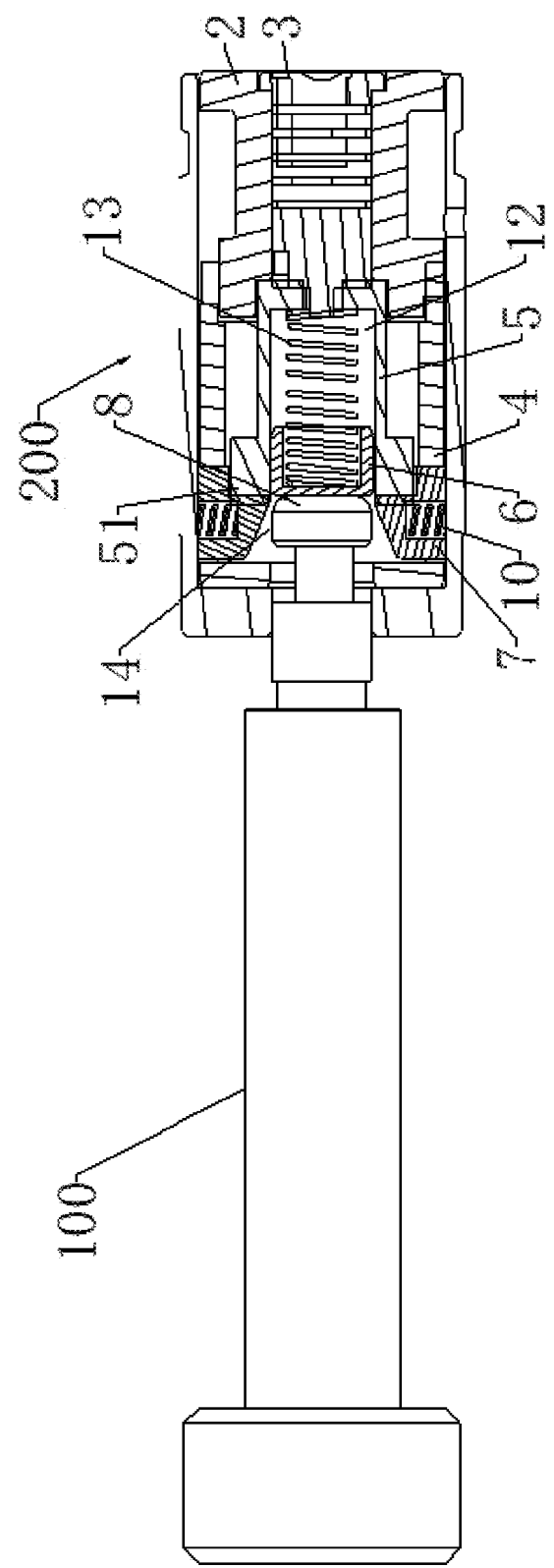
FIG. 2 is a schematic diagram of the overall structure according to the present invention (during disassembly)
Figure 3:
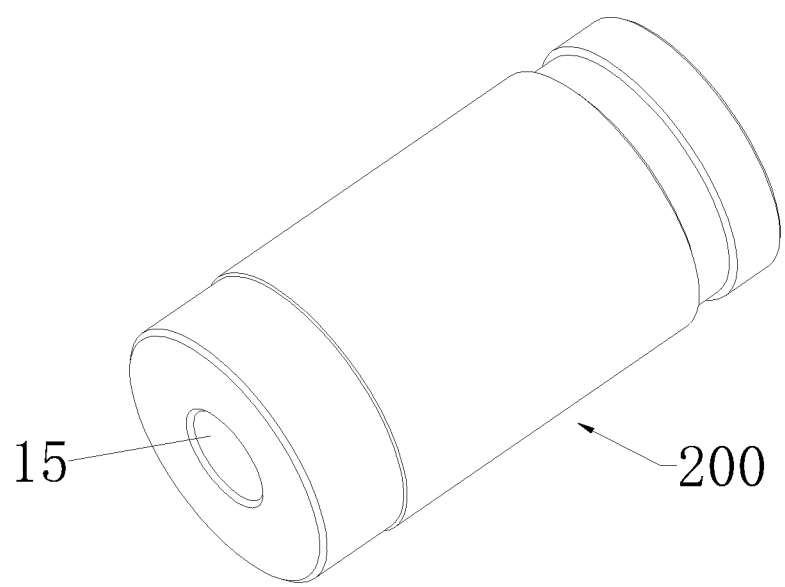
FIG. 3 is a schematic structural diagram of a cylinder according to the present invention.
Figure 4:
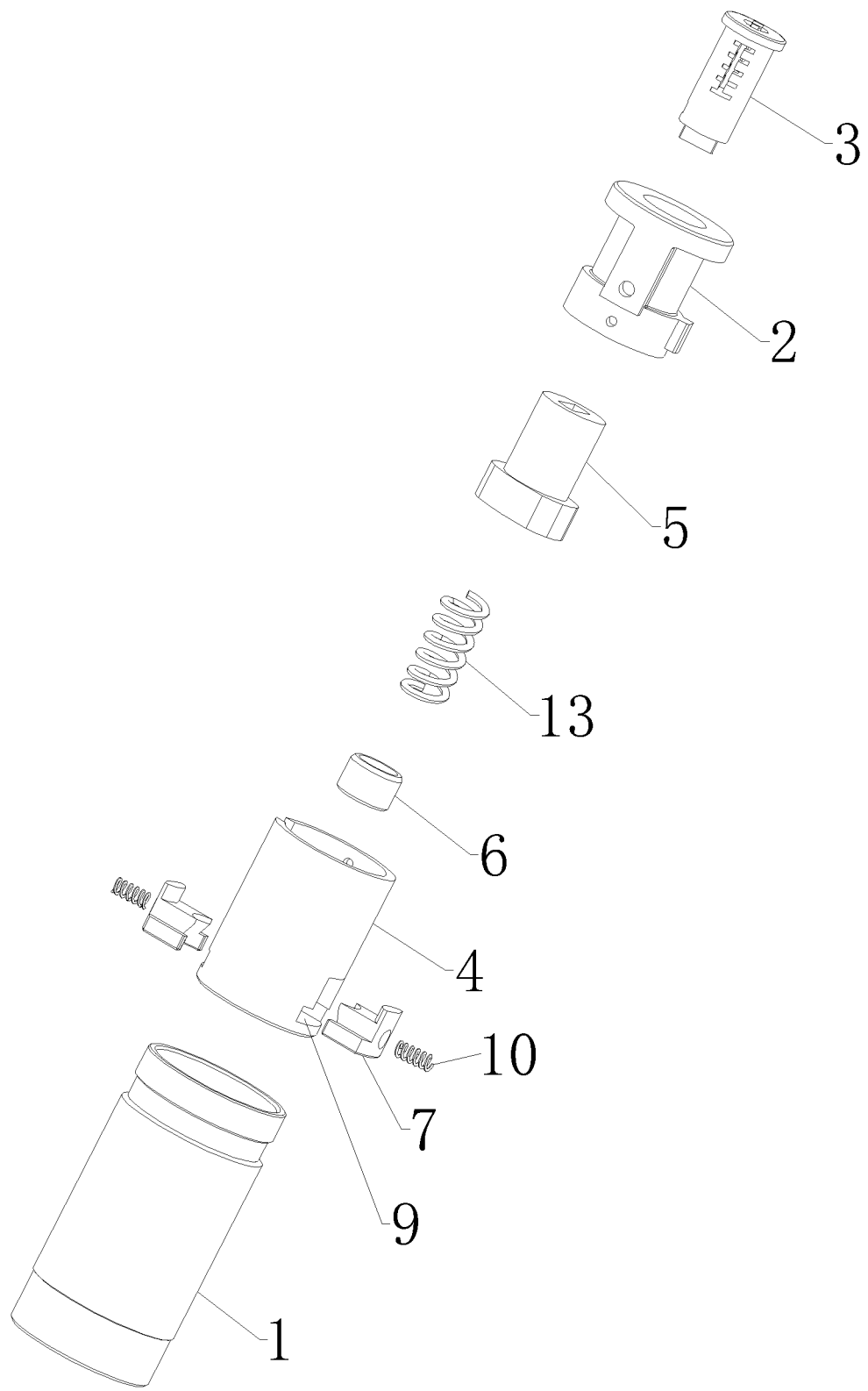
FIG. 4 is a schematic exploded diagram of the cylinder according to the present invention.
Figure 5:
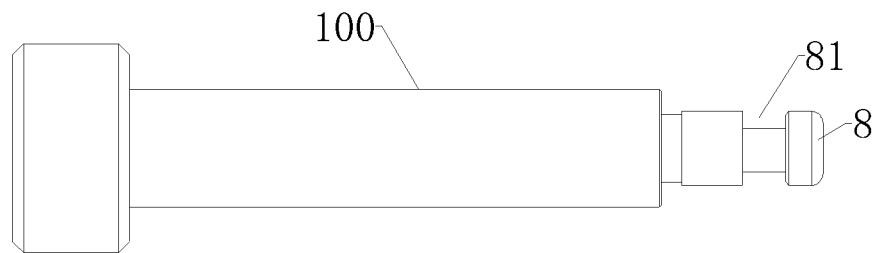
FIG. 5 is a schematic structural diagram of a lock bar according to the present invention.
Figure 6:
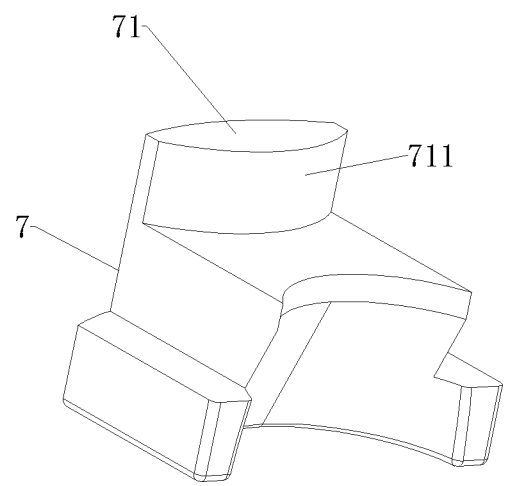
FIG. 6 is a schematic structural diagram of a bolt according to the present invention.
Figure 7:
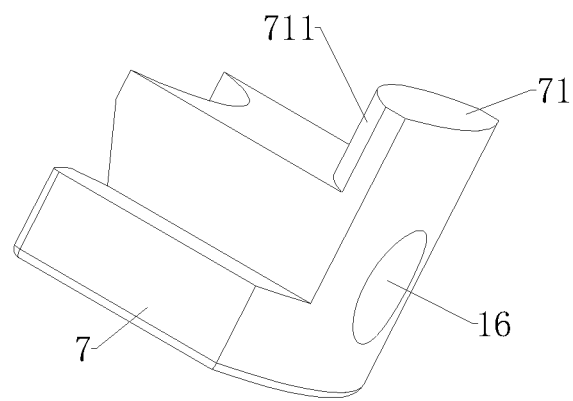
FIG. 7 is another schematic structural diagram of the bolt according to the present invention.
Figure 8:
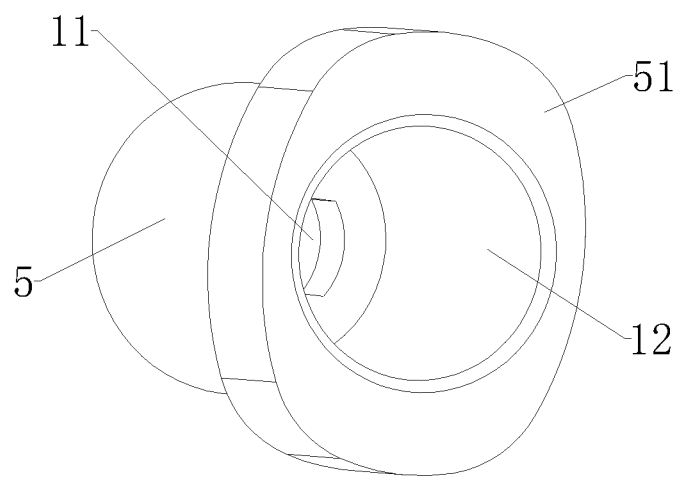
FIG. 8 is a schematic structural diagram of a cam according to the present invention.

During disassembly, the key is inserted into the plug 3, the plug 3 is rotated to drive the cam 5 to rotate, the bolt 7 is pressed to move outwards by the rotating block 51 at the rear end of the cam 5 after rotation, and separated from the neck 81, the telescopic core 6 is subjected to an elastic force of the second spring 13 to push the press head 8 backwards, the lock bar 100 is pushed backwards, as shown in FIG. 2, and then the lock bar 100 may be pulled out.

Certainly, the above description is merely a preferred embodiment of the present invention, and not intended to limit the scope of the present invention. Simple modifications and equivalent structural changes to the contents of the specification and drawings of the present invention should also be included within the scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A trailer lock, comprising:

a lock bar;

a cylinder connected with the lock bar, the cylinder comprising an outer casing; and a plug casing mounted at a front end of the outer casing and a plug provided in a middle of the plug casing, wherein the cylinder further comprises a bolt casing fixed in the outer casing and a cam accommodated in the bolt casing and connected with the plug;

a telescopic core is provided in the cam, telescopic bolts for fixing the lock bar are provided at two sides of the bolt casing, each of the two bolts has a front end connected with a rear end of the cam, and the lock bar has a front end provided with a press head having an annular neck where the each of the two bolts is clamped;

through holes where the each of the two bolts is clamped are provided at two sides of a rear end of the bolt casing; the each of the two bolts is mounted into the bolt casing along the through hole; a bump connected with the cam is provided at the front end of the bolt; a first spring is provided between the each of the two bolts and the outer casing perpendicular to a cylindrical direction of the cylinder; an accommodating hole is provided at an outer side of the each of the two bolts; and the first spring extends into the accommodating hole and has an outer end pressed against an inner wall of the outer casing;

the cam has a front end provided with an insertion hole where a rear end of the plug is inserted; an accommodating groove is formed at the rear end of the cam; a second spring is mounted in the accommodating groove along the cylindrical direction of the cylinder and has a rear end connected with the telescopic core; and a rotating block, provided at the rear end of the cam, is abutted against an inner side of the bump, the rotating block is oval, and an arc convex surface is provided at the inner side of the bump, when the plug is not rotated using a key, a side wall of the rotating block in a short axis direction thereof comes into contact with the bump at the front end of the each of the two bolts without pressing the bump, and when the rotating block is rotated, the bump is pressed by a side wall of the rotating block in a long axis direction thereof, the each of the two bolts is moved outwards, and the first spring is compressed; and a channel is formed between the two bolts and has a large rear-end opening and a small front-end opening; each of the two bolts has an oblique inner wall; a through hole is provided at a rear end of the outer casing and is inserted into the channel to come into contact with an inner wall of the each of the two bolts and gradually press the bolt outwards; the press head sequentially penetrates through the through hole and the channel, pushes the each of the two bolts away to extend into the accommodating groove of the cam, and is then pressed against the telescopic core; after the press head is separated from the each of the two bolts, the each of the two bolts is subjected to an elastic force of the first spring; and an inner end of the each of the two bolts is clamped into the neck of the press head, wherein during assembly, the press head at the front end of the lock bar is inserted into the outer casing directly, and pushes the each of the two bolts away to extend into the cam and press the telescopic core, the second spring is compressed, the inner end of the bolt is clamped into the neck of the press head by the elastic force of the first spring at the moment when the press head is separated from the each of the two bolts, and the lock bar is fixed completely; and during disassembly, the key is inserted into the plug, the plug is rotated to drive the cam to rotate, the each of the two bolts is pressed to move outwards by the rotating block at the rear end of the cam after rotation, and separated from the neck, the telescopic core is subjected to an elastic force of the second spring to push the press head backwards, the lock bar is pushed backwards, and then the lock bar is pulled out; and the outer casing, the bolt casing, the telescopic core, the second spring, the cam, the plug casing and the plug are disposed along the cylindrical direction of the cylinder.

* * * * *